(12) United States Patent
Edelbrock

(10) Patent No.: US 7,505,025 B2
(45) Date of Patent: Mar. 17, 2009

(54) ARRANGEMENT WITH A FLAT SCREEN PANEL

(75) Inventor: Ralf Edelbrock, Karlsruhe (DE)

(73) Assignee: EIZO GmbH, Karlsruhe (DE)

( * ) Notice: Subject to any disclaimer, the term of this patent is extended or adjusted under 35 U.S.C. 154(b) by 509 days.

(21) Appl. No.: 11/015,552

(22) Filed: Dec. 20, 2004

(65) Prior Publication Data
US 2005/0190136 A1 Sep. 1, 2005

(30) Foreign Application Priority Data
Dec. 19, 2003 (DE) ................................ 103 59 987

(51) Int. Cl.
*G09G 3/20* (2006.01)
(52) U.S. Cl. ........................................ 345/102; 345/77
(58) Field of Classification Search .................. 345/88, 345/102, 45, 77, 89, 207; 349/159; 445/24; 348/189, 602, 712; 315/169.3, 149; 358/514
See application file for complete search history.

(56) References Cited

U.S. PATENT DOCUMENTS

| | | | | |
|---|---|---|---|---|
| 5,068,739 | A * | 11/1991 | Filo | 348/96 |
| 6,529,212 | B2 * | 3/2003 | Miller et al. | 345/690 |
| 6,798,517 | B2 * | 9/2004 | Wagner et al. | 356/406 |
| 6,898,327 | B1 * | 5/2005 | Hrusecky et al. | 382/260 |

\* cited by examiner

*Primary Examiner*—Abbas I Abdulselam
(74) *Attorney, Agent, or Firm*—Sughrue Mion, PLLC

(57) ABSTRACT

An arrangement with a panel of a flat screen and a graphics processor, to which a digitized image signal can be applied. A lookup table evaluates the digitized image signal and transmits the digitized image signal to the panel via an interface, whereby the image information is visually displayed. Suitable means are used to reduce interfering influences on the image reproduction characteristic of the panel due to aging effects of the light transmitting parts of the panel, e.g., due to aging effects of the panel glass, the LCD fluid or the diffuser and/or polarization foils. The sensor is only visible above the display surface during a calibration phase. The image reproduction characteristic is adjusted automatically on site, e.g., while the flat screen is in use. No service personnel are required for this purpose.

11 Claims, 4 Drawing Sheets

1 Graphics Processor
2 A/D Converter
4 LCD Panel
6 Backlight Control
7 Backlight
8 Backlight Sensor
9 Interface
10 Measuring Unit
11 Sensor
12 Sensor Holder
13 A/D Converter

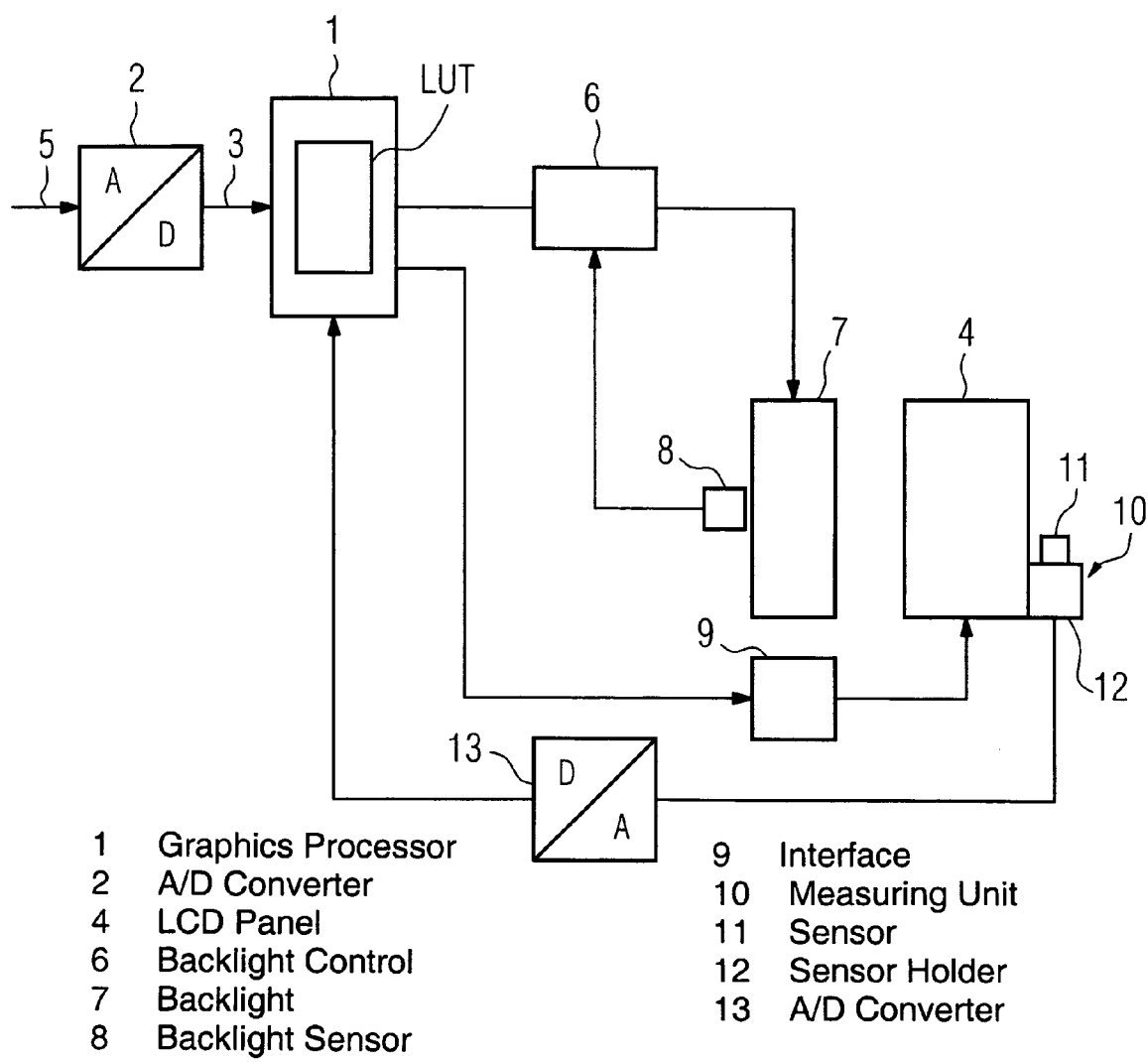

| EV | AV | KR | AV | KG | AV | KB |
|---|---|---|---|---|---|---|
| Input | Output Red | | Output Green | | Output Blue | |
| 0 | 0 | | 0 | | 0 | |
| 8 | 4 | | 6 | | 4 | |
| 64 | 60 | | 69 | | 47 | 3 (Kw) |
| 128 | 133 | | 132 | | 143 | |
| 255 | 255 | | 255 | | 255 | |

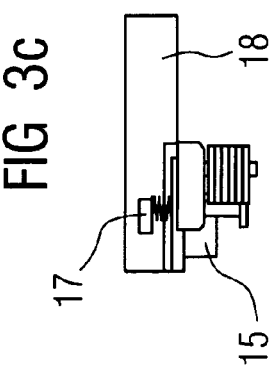
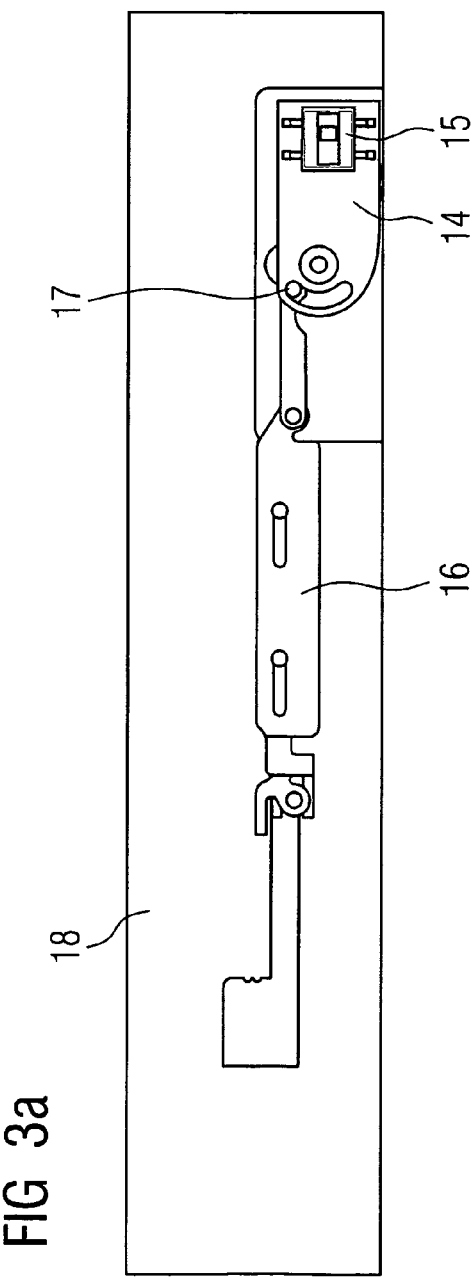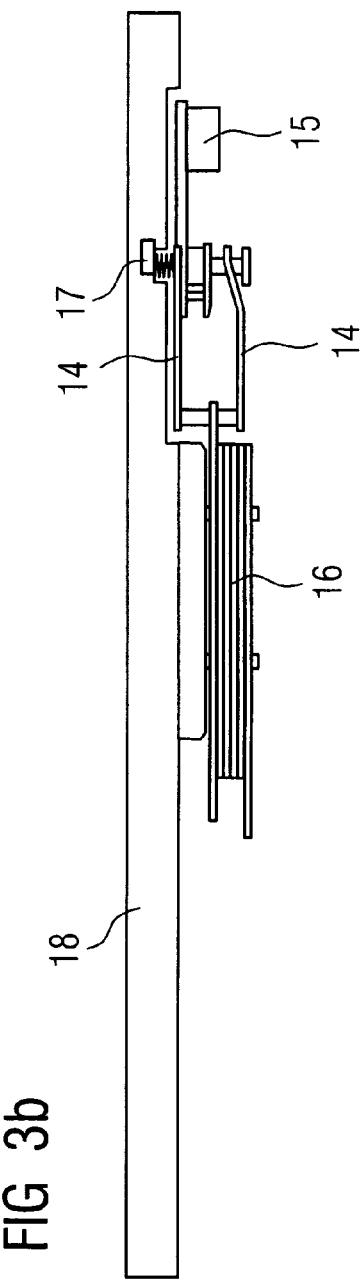

ARRANGEMENT WITH A FLAT SCREEN PANEL

This application claims priority from German Patent Application No. 10359987.8, filed on Dec. 19, 2003, in the German Patent Office, the disclosure of which is hereby incorporated into this application by reference.

FIELD AND BACKGROUND OF THE INVENTION

The invention relates to an arrangement with a panel of a flat screen, in which a digitized image signal is applied to a graphics processor. A lookup table evaluates the digitized image signal and transmits the digitized image signal to the panel via an interface, whereby the image information is visually depicted.

Conventionally, an image reproduction characteristic, e.g., of a color flat screen, is adapted to the sensitivity of the human eye by correcting the image data to be reproduced on the flat screen. The image reproduction characteristic indicates how an image displaying system converts an electrical image signal to an optical signal. The optical signal is described by three quantities: luminance, which is responsible for the perception of brightness, and two additional quantities describing chromaticity.

The image reproduction characteristic can be adjusted with the aid of a lookup table. There are several quasi standards for the image reproduction characteristic, e.g., DICOM or CIELAB. The lookup table consists of three different tables: one for red, one for green and one for blue. The lookup table is used to optimize the image reproduction characteristic.

A graphics processor, located in a circuit arrangement for controlling the flat screen, performs the correction to the image reproduction characteristics by checking the lookup table to determine which value it should apply to the flat screen in place of the video signal level that is present at a given moment. Thus, it is possible to modify the image data sent to the flat screen with an optimal image reproduction characteristic.

However, aging effects of the light transmitting parts of the panel, e.g., due to aging effects of the panel glass, the LCD fluid or the diffuser and/or polarization foils, may interfere with the optimal image reproduction characteristic.

OBJECTS OF THE INVENTION

One object of the present invention is to provide an arrangement of a panel of a flat screen, which makes it simpler to adjust the image reproduction characteristic of the panel during a calibration phase.

SUMMARY OF THE INVENTION

This and other objects are attained, according to one formulation of the invention, by providing an arrangement with a panel of a flat screen, having a graphics processor to which a digitized image signal is applied; wherein a lookup table evaluates the digitized image signal and transmits it to the panel via an interface, whereby the image information is visually displayed; wherein during a calibration phase, a luminance of a test image is measured by a sensor; wherein the sensor is arranged in an area of the flat screen that is not visible to a viewer; wherein a pivoting device is provided for pivoting the sensor substantially parallel to the panel from a standby position into a position for measuring the luminance; and wherein the graphics processor can adjust the lookup table as a function of the measured luminance.

The advantage is that interfering influences on the image reproduction characteristic due to aging effects of the light transmitting parts of the panel, e.g., due to aging effects of the panel glass, the LCD fluid or the diffuser and/or polarization foils, are reduced. In addition, the sensor is only visible above the display surface during the calibration phase. The image reproduction characteristic is automatically adjusted on site, e.g., while the flat screen is in use. No service personnel are required for this purpose.

One non-limiting embodiment of the invention provides that the sensor can be lowered in the direction of the panel, such that the distance between the sensor and the panel can be reduced to obtain better measurement results.

The measurement results are further improved by a sealing device, which is provided to shield the sensor from ambient light. The sealing device, e.g., in the form of sealing lips, prevents the ambient light from affecting the measurement results.

In a further embodiment of the invention, the sensor is automatically cleaned as it is being pivoted into its measurement position or back into its standby position. This prevents the build-up of impurities on the sensor, which may have a negative effect on the measurement results. It also makes it possible to increase the intervals between sensor maintenance.

The sensor and the pivoting device for pivoting the sensor are advantageously accommodated in a recess of the frame, preferably the lateral frame of the flat screen, such that a viewer cannot see the sensor and the pivoting device during normal operation, i.e., outside the calibration phases.

BRIEF DESCRIPTION OF THE DRAWINGS

The invention, its embodiments and advantages will now be described in greater detail with reference to an exemplary embodiment of the invention depicted in the drawing, in which:

FIG. 1 illustrates an arrangement for adjusting the brightness of an image displayed on an LCD panel;

FIG. 2a illustrates a lookup table;

FIG. 2b illustrates a graphic representation of the color blue in the lookup table in FIG. 2a;

FIGS. 3a, 3b and 3c illustrate a front view, a side view and a top view, respectively, of a sensor mounted on a sensor holder in the standby position.

DETAILED DESCRIPTION OF THE PREFERRED EMBODIMENTS

Figures 2A, 2B:
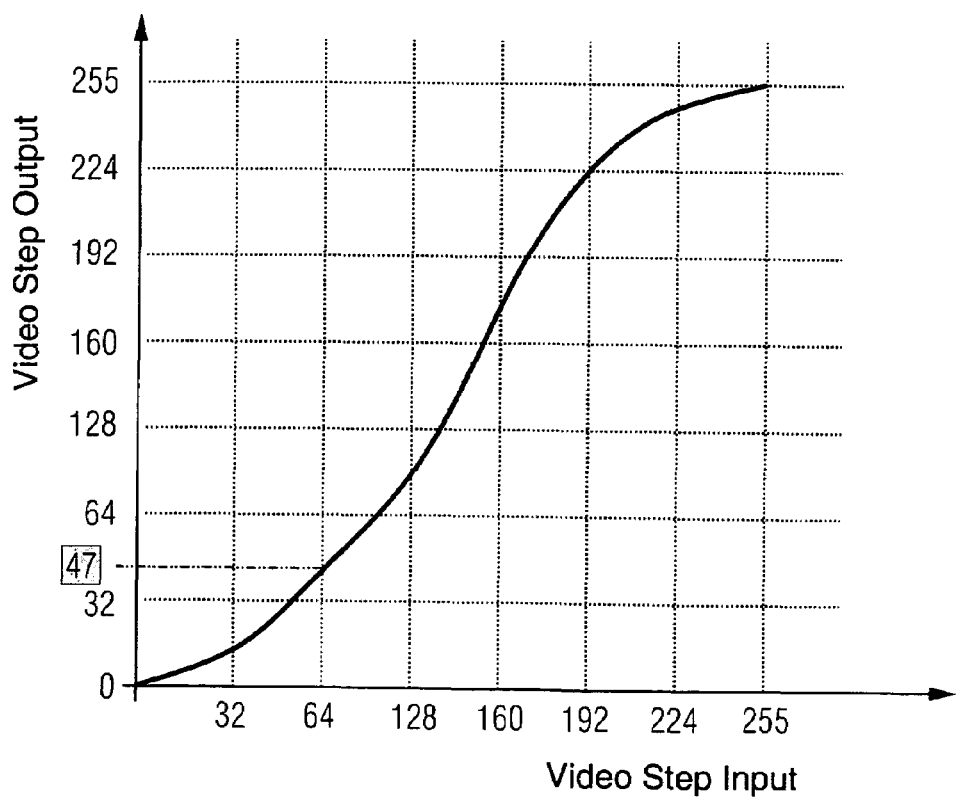
Figure 4A:
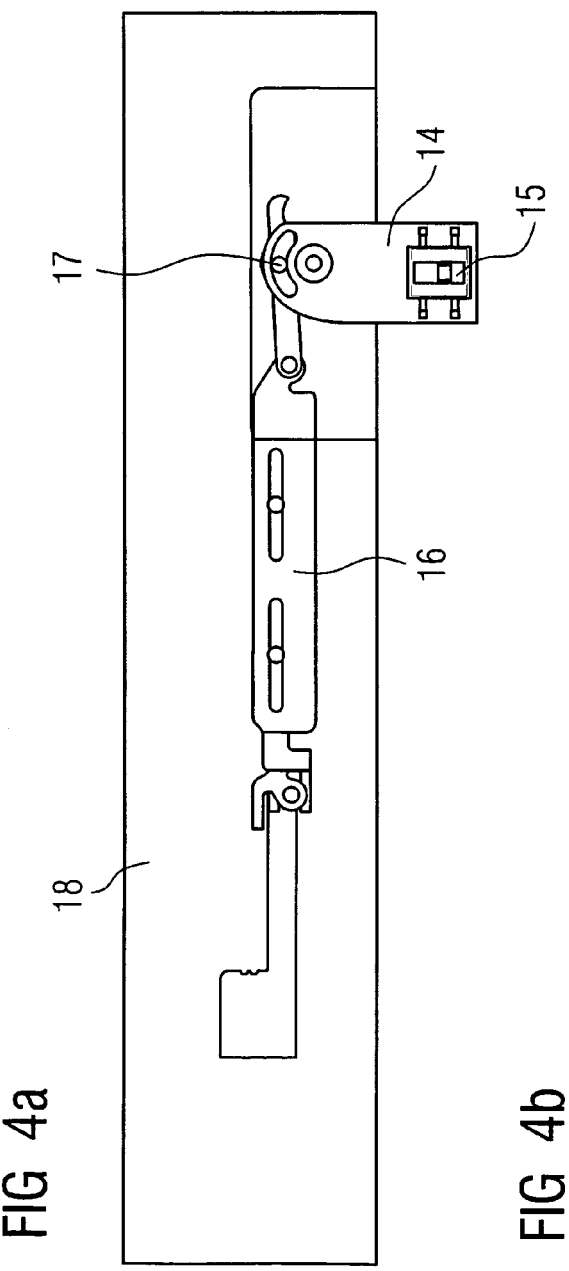
FIGS. 4a, 4b, and 4c illustrate a front view, a side view and a top view, respectively, of a sensor mounted on a sensor holder in the calibration position.
Figure 4B:
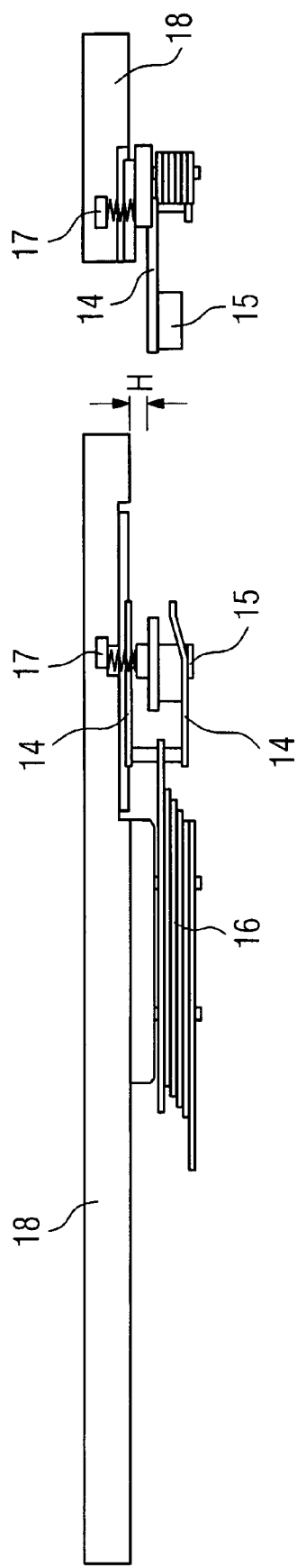
Figure 4C:
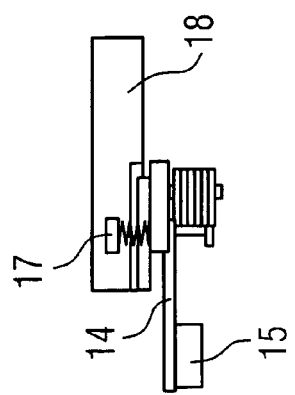

In FIG. 1, an 8-bit A/D converter 2 applies a digitized image signal 3 to a graphics processor 1 to display an image on an LCD panel 4 of a flat screen. The digitized image signal 3 includes video steps from 0 to 255, which the A/D converter 2 generates from an analog image signal 5 within a voltage range of 0 volt to 0.7 volt. These video steps 0 to 255 are supplied to a lookup table LUT, which evaluates the video steps—as will be shown below—and optimizes them with reference to the image reproduction characteristic. The graphics processor 1 drives a backlight control 6 that controls the luminance of the backlight 7 to obtain essentially constant luminance conditions. To achieve the constant luminance conditions, a backlight sensor 8 is provided to detect the luminance of the backlight 7. The backlight control 6 uses the detected luminance of the backlight sensor 8 to adjust the backlight 7 to a desired luminance. The graphics processor 1 transmits the evaluated digital image signal (evaluated video steps) to the panel 4 via a suitable interface 9, whereby the image information is visually displayed.

FIG. 2a shows an example of a lookup table and FIG. 2b shows a graph of the lookup table in FIG. 2a for the color blue. In this example, the image reproduction characteristic of a panel is optimized at a factory setting and that, for this purpose, output video steps AV in a range of 0 to 255 have been determined for the colors red, green and blue for the corresponding input video steps EV in a range of 0 to 255. The output video steps AV together with the corresponding input video steps EV are entered in the lookup table as shown in FIG. 2a. During a normal operating mode, e.g., while the panel is in use in the medical field, the graphics processor 1 (FIG. 1) uses this lookup table to determine which output video step AV is to be transmitted to the panel for a given input video step EV. For example, if the A/D converter 2 supplies a video step 64 as an input video step EV to the graphics processor 1, the graphics processor 1 reads out a video step 47 for the color blue as the output video step AV from the lookup table and supplies this value (shaded gray in the figure) to the panel 4 via the interface 9.

To prevent aging effects of the light transmitting parts of the panel, e.g., aging effects of the panel glass, the LCD fluid or the diffuser and/or polarization foils, from interfering with the optimized image reproduction characteristic, an automatic adjustment of the optimized image reproduction characteristic is provided.

To automatically adjust the image reproduction characteristic of the panel 4 (FIG. 1), a measuring unit 10 mounted on the front side of the panel 4 scans the optical image information of a test image displayed on the panel during a calibration phase and measures the luminance of this test image. In the present example, a test image must be provided for each color of the color panel, red, green and blue, such that video steps in the range of 0 to 255 are transmitted to the graphics processor for each color. In the case of a monochrome panel, a test image including 256 gray tones is sufficient, such that each gray tone corresponds to a video step of an 8-bit A/D converter.

For example, during the calibration phase for the color blue, the graphics processor 1 supplies a video step 47 to the panel 4 via the interface 9. While the blue shade is displayed, the measuring unit 10 measures the luminance of the panel 4 for the video step 47 and applies a voltage corresponding to this luminance to an A/D converter 13. The A/D converter 13 generates a video step corresponding to this voltage, which it transmits to the graphics processor 1. The graphics processor 1 compares this video step with the video step 47 supplied to the panel 4 and adjusts the lookup table as a function of the result of this comparison. If, for example, the A/D converter 13 transmits a video step 44 to the graphics processor 1 based on the luminance measured by the measuring unit 10, the graphics processor 1 adjusts the lookup table by entering a correction value Kw in a correction column KB for the color blue. In the example shown, the correction value Kw equals 3, such that during a normal operating mode, for an input video step 64, the graphics processor 1 supplies a video step 50 to the panel 4 for the color blue. This means that the graphics processor 1 adds a correction value Kw of 3 to the output video step 47 of the color blue.

The luminances for each input video step EV and each color are measured in this manner during the calibration phase, and the correction values thereby determined are stored according to the color to which they belong in correction columns KR, KG or KB for the colors red, green or blue. During the normal operating mode, the graphics processor 1 adds these correction values to the corresponding output video steps AV.

The test image does not need to fill the panel completely. It is sufficient to display the test image in a "calibration window." This image can be inserted in the window even while an image is being displayed during a normal operating phase of the flat screen. Components of the measuring unit 10 are a sensor 11 and a sensor holder 12 on which the sensor 11 is mounted. The sensor 11 and the sensor holder 12 are arranged in a recess of the frame of the flat screen so that they are not visible to a viewer. To be able to measure the luminance of the test image during the calibration phase, the sensor 11 is pivotable substantially parallel to the panel from a standby position to a measurement position, in which the sensor 11 is visible to the viewer. While being pivoted in the direction of the panel 4, the sensor 11 is preferably lowered, such that the sensor 11 can properly measure the luminance without touching the panel 4. After the calibration phase, the sensor 11 is pivoted back into its standby position, in which the sensor 11 and the sensor holder 12 are again positioned in the recess of the flat screen frame, such that they are not visible to the viewer.

To prevent ambient light from interfering with the measurement of the luminance, sealing lips (not depicted) are provided, which shield the sensor 11 from the ambient light.

FIGS. 3a, 3b, 3c, 4a, 4b and 4c show a front view (FIGS. 3a and 4a), a side view (FIGS. 3b and 4b) and a top view (FIGS. 3c and 4c) of a sensor 15 mounted on a sensor holder 14. The sensor holder 14 is rotatably supported and can be pivoted by means of an actuator 16 and mechanical means 17. The actuator 16, e.g., an actuator made by Nanomuscle (Internet address: http://www.nanomuscle.com), together with the sensor holder 14 and the sensor 15, is located in a recess of a frame of a flat screen, preferably on a vertical part of the frame, and is mounted to a base plate 18, which is covered by the frame and arranged parallel to the frame. As a result, in a standby position (FIG. 3), the base plate 18, the mechanical means 17, the actuator 16, the sensor 15 and the sensor holder 14 are not visible to a viewer of the panel. In a measurement position during a calibration phase (FIG. 4), in which the sensor 15 measures the luminance of a panel, the sensor holder 14 together with the sensor 15 is pivoted through a 90-degree angle. During the pivoting process, the sensor holder 14 is simultaneously lowered toward the panel surface (indicated as the lowering height H in FIGS. 4b and 4c) to position the sensor 15 closer to the panel surface. Sealing lips (not depicted) prevent ambient light from distorting the measurement results. Once the sensor 15 is positioned, the luminance of a test image displayed on the panel in a calibration window is measured for the duration of the calibration phase. The calibration window can be superimposed on the normal image. After the calibration phase, the sensor 15 is pivoted back into its standby position.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. An arrangement comprising:
a panel of a flat screen,
a graphics processor to which a digitized image signal is applied,
a lookup table configured to evaluate the digitized image signal and transmit the signal to the panel via an interface, whereby image information from the signal is displayed on the panel of the flat screen,
wherein, during a calibration phase, a test image is displayed on the panel of the flat screen and a luminance of the test image is measured by a sensor, and the sensor for measuring the luminance of the test image on the panel is arranged in a standby position in an area of the flat screen that is not visible to a viewer,
further comprising a pivoting device carrying the sensor to attach the sensor to the flat screen and to pivot the sensor substantially parallel to the panel from the standby position into a position for measuring the luminance of the test image on the panel, and
wherein the graphics processor adjusts the lookup table as a function of the measured luminance.

2. The arrangement as claimed in claim 1, wherein the pivoting device is configured to lower the sensor toward the panel during a pivoting process.

3. The arrangement as claimed in claim 2, further comprising a sealing device configured to shield the sensor from ambient light while the luminance is being measured.

4. The arrangement as claimed in claim 3, wherein the sensor and the pivoting device are arranged in a recess of a frame of the flat screen.

5. The arrangement as claimed in claim 2, further comprising a cleaning device configured to clean the sensor as it is being pivoted into the measurement position or back into the standby position.

6. The arrangement as claimed in claim 2, wherein the sensor and the pivoting device are arranged in a recess of a frame of the flat screen.

7. The arrangement as claimed in claim 1, further comprising a sealing device configured to shield the sensor from ambient light while the luminance is being measured.

8. The arrangement as claimed in claim 7, further comprising a cleaning device configured to clean the sensor as it is being pivoted into the measurement position or back into the standby position.

9. The arrangement as claimed in claim 7, wherein the sensor and the pivoting device are arranged in a recess of a frame of the flat screen.

10. The arrangement as claimed in claim 1, further comprising a cleaning device configured to clean the sensor as it is being pivoted into the measurement position or back into the standby position.

11. The arrangement as claimed in claim 1, wherein the sensor and the pivoting device are arranged in a recess of a frame of the flat screen.

* * * * *